United States Patent [19]
Brock et al.

[11] Patent Number: 5,734,942
[45] Date of Patent: *Mar. 31, 1998

[54] MID-ROLL CHANGE FOR FILM HAVING EDGE PERFORATIONS AND MAGNETIC LAYER ON NON-EMULSION SIDE

[75] Inventors: George W. Brock, La Jolla; Thomas D. Carr, Leucadia, both of Calif.

[73] Assignee: Eastman Kodak Company, Rochester, N.Y.

[*] Notice: The term of this patent shall not extend beyond the expiration date of Pat. No. 5,678,087.

[21] Appl. No.: 760,623

[22] Filed: Dec. 4, 1996

[51] Int. Cl.⁶ .................................................. G03B 17/24
[52] U.S. Cl. .......................... 396/319; 396/320; 396/390; 396/392
[58] Field of Search ............................. 396/310, 319, 396/320, 387, 389, 390, 392

[56] References Cited

U.S. PATENT DOCUMENTS

| | | | |
|---|---|---|---|
| 4,860,037 | 8/1989 | Harvey | 396/319 X |
| 4,996,546 | 2/1991 | Pagano et al. | 396/319 |
| 5,005,031 | 4/1991 | Kelbe | 396/320 |
| 5,016,030 | 5/1991 | Dwyer et al. | 396/319 X |
| 5,272,498 | 12/1993 | Wakabayashi | 396/320 |
| 5,307,100 | 4/1994 | Kubo | 396/319 |
| 5,321,452 | 6/1994 | Tsujimoto | 396/319 X |
| 5,583,591 | 12/1996 | Saito et al. | 396/429 |

*Primary Examiner*—Safet Metjahic
*Assistant Examiner*—J. K. Han
*Attorney, Agent, or Firm*—William F. Noval

[57] ABSTRACT

In a camera having an exposure gate and a transport for transporting film past the exposure gate, the film having a series of perforations along at least one edge of the film, wherein the number of the perforations are an integer per exposure frame, the film having a substantially transparent magnetic layer at least in the region of the perforations, a mid-roll change apparatus. The mid-roll change apparatus includes a source of a steady-state magnetic field located downstream of the exposure gate and adjacent to the series of perforations for magnetizing the magnetic layer between the perforations as film is transported past the source; a magnetic field sensor located upstream of the exposure gate and adjacent to the series of perforations for sensing fringing magnetic fields emanating from perforation edges, the area between which have been magnetized; and a perforation sensor located to sense the series of perforations of the film.

6 Claims, 5 Drawing Sheets

MID-ROLL CHANGE FOR FILM HAVING EDGE PERFORATIONS AND MAGNETIC LAYER ON NON-EMULSION SIDE

FIELD OF INVENTION

This invention relates in general to systems for recording and reproducing information on a magnetic layer of photographic film and relates more particularly to a technique for implementing mid-roll change in such film systems.

BACKGROUND OF THE INVENTION

U.S. Pat. Nos. 4,996,546, 5,005,031, 5,016,030, 5,028,440, 5,272,498, 5,307,100, and 5,321,452, disclose photographic systems that record information on photographic film making use of a substantially transparent magnetic layer coated over the whole non-emulsion side of the film. The information is recorded in tracks near the edge of the film strip. The system allows uninterrupted recording by having perforations along only one film edge and reducing the number of perforations to two per frame. The two perforations are in close proximity to each other and thus allow an extended region between the pairs of perforations to be available for uninterrupted recording.

It is advantageous in a camera system to be able to interrupt use of a film cassette before complete use of the film roll, and to be able to replace the cassette in the camera at a later time. This is called mid-roll interrupt (MRI) or mid-roll change. U.S. Pat. No. 4,860,037 discloses a method of MRI, in which a perforation sensor drops into an edge perforation hole as it passes and, in so doing, closes a metering switch which counts the number of perforations that have passed the sensor. When the film is rewound into its container, the number of counts is recorded on the edge of the film leader. When the film cassette is reloaded into the camera, the edge head reads the recorded count information and causes the film to advance to the first unexposed frame by the sensor, counting the number of perforations recorded on the leader edge. This patent requires that the perforations are spaced apart to fall between the film frames and that the side of the film on which the perforation count data is written to be free of perforations. Because of this, the patent is not applicable to 35 mm film, which has continuous lines of perforations on both edges of the film. Thus, if magnetic recorded data is to be recorded on continuously perforated film, such as 35 mm film, then that data would have to be recorded in the image frame area, which may not be desirable from surface damage considerations. In addition, photofinishers have no reference markers on a 35 mm film strip to identify and align frame boundaries in a printing gate when making prints. The photofinisher must locate the frame boundaries by eye and produce a physical notch in the filmstrip to mark frame locations. It would be advantageous to eliminate this notching step.

SUMMARY OF THE INVENTION

According to the present invention, there is provided a solution to the problems referred to above.

According to an aspect of the present invention, there is provided in a camera having an exposure gate and means for transporting film past the exposure gate, the film having a series of perforations along at least one edge of the film, wherein the number of the perforations are an integer per exposure frame, the film having a substantially transparent magnetic layer at least in the region of the perforations, the improvement comprising:

a source of a steady-state magnetic field located downstream of the exposure gate and adjacent to the series of perforations for magnetizing the magnetic layer between the perforations as film is transported past the source;

a magnetic field sensor located upstream of the exposure gate and adjacent to the series of perforations for sensing fringing magnetic fields emanating from perforation edges, the area between which have been magnetized; and a perforation sensor located to sense the series of perforations of the film.

ADVANTAGEOUS EFFECT OF THE INVENTION

The invention has the following advantages.

1. A mid-roll change system is provided that is applicable to perforated films, such as 35 mm films having a magnetic layer.

2. Exposed film frames of perforated film can be identified and used in subsequent photofinishing steps without the need to notch the film to identify an exposed frame.

DETAILED DESCRIPTION OF THE INVENTION

Figure 2:
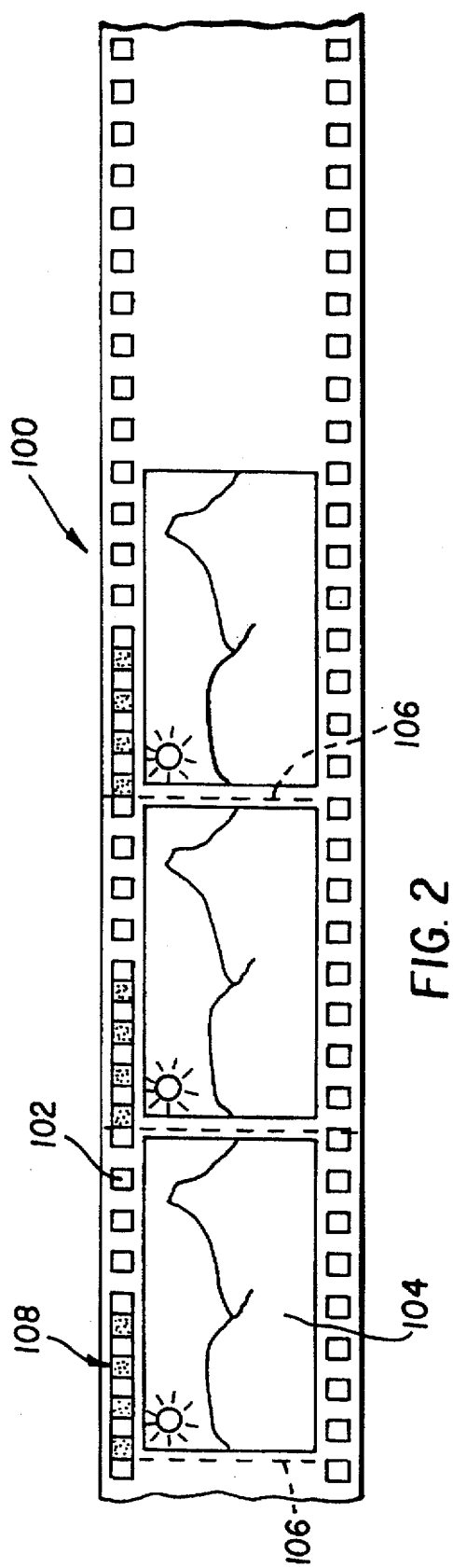
FIGS. 2 and 3 are respectively top and side elevational views of perforated film having a magnetic layer.
Figure 3:
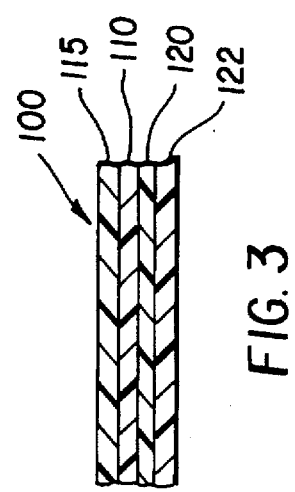

The present invention will be described below to a photographic system including a camera which uses standard perforated film (e.g., 35 mm) having a magnetic layer. As shown in FIGS. 2 and 3, a strip of film 100 includes a base 110, various well-known photochemical layers 115 on one side of base 110, and a virtually transparent magnetic layer 120 on the other side of base 110. An anti-static layer and lubricating layer 122 covers the magnetic layer 120. A series of equally spaced perforations 102 are provided along each edge of film 100. As shown, each exposed frame 104 has an equal number (e.g., 8) of perforations 102 per frame. The frame boundary 106 is located at the edge of the last perforation of a set.

Figure 1:
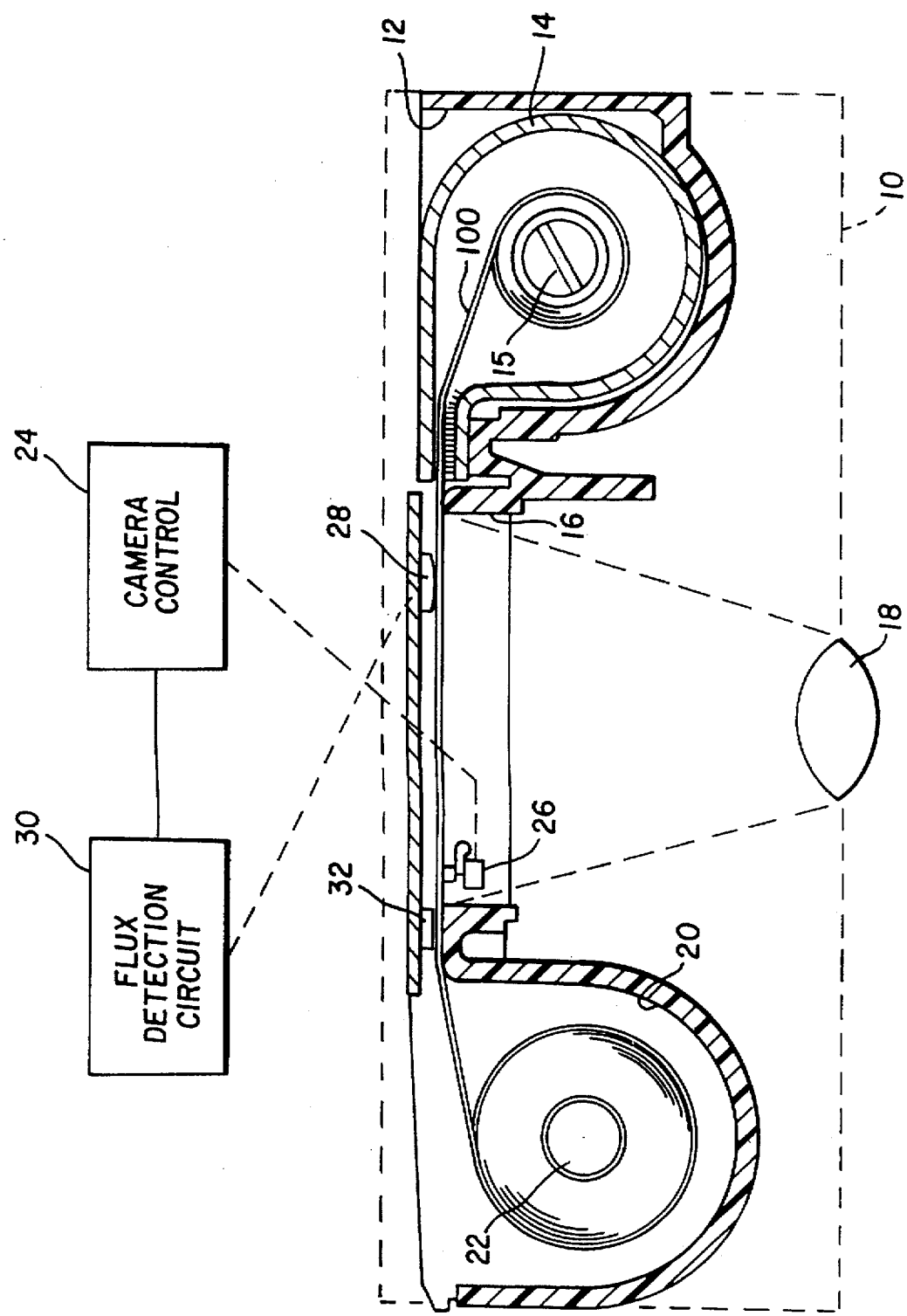
FIG. 1 is an elevational view of a camera incorporating the present invention.

FIG. 1 shows a camera 10 designed to use film 100. Camera 10 includes a film 100. Camera 10 includes a film cartridge chamber 12 for receiving a cartridge 14 of film 100 wound on supply spool 15, a film exposing gate 16, a lens 18, a film take-up chamber 20 including rotatable take-up spool 22. Spool 22 may be rotated manually by a camera user or driven automatically by a motor (not shown). Camera 10 also includes camera control 24, a film perforation sensor 26 (e.g., an optical, mechanical, or magnetic sensor) connected to control 24, and a magnetic field sensor 28 connected to magnetic flux detection circuit 30 which is connected to camera control 24. Magnetic field sensor 28 can, for example, be a magnetoresistive sensor, a Hall effect sensor, or an inductive magnetic head. A source of a steady state magnetic field, such as permanent magnet 32 (or DC inductive magnetic head), is also provided.

Figure 4:
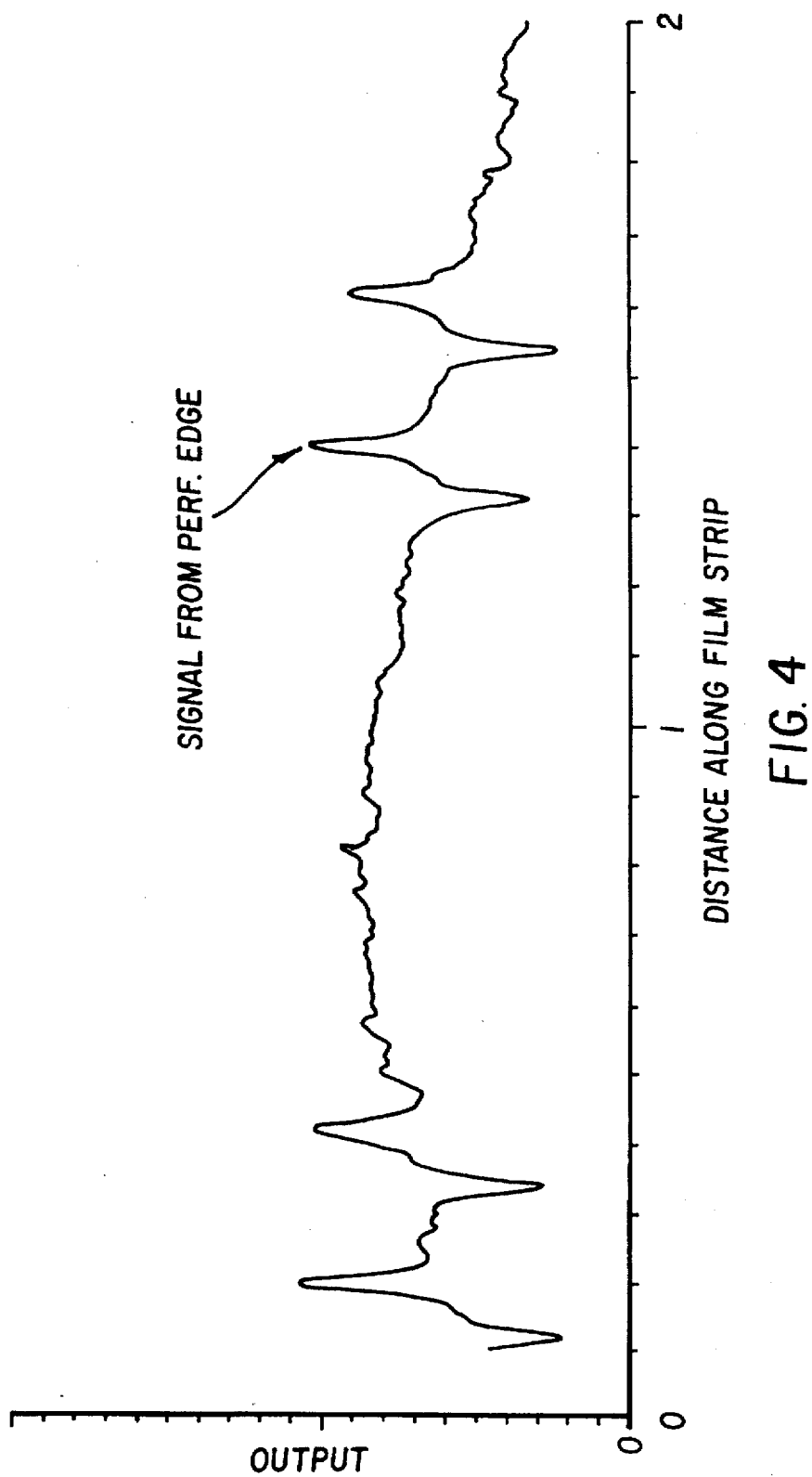
FIG. 4 is a signal diagram illustrating the output from a magnetic field sensor.
Figure 5:
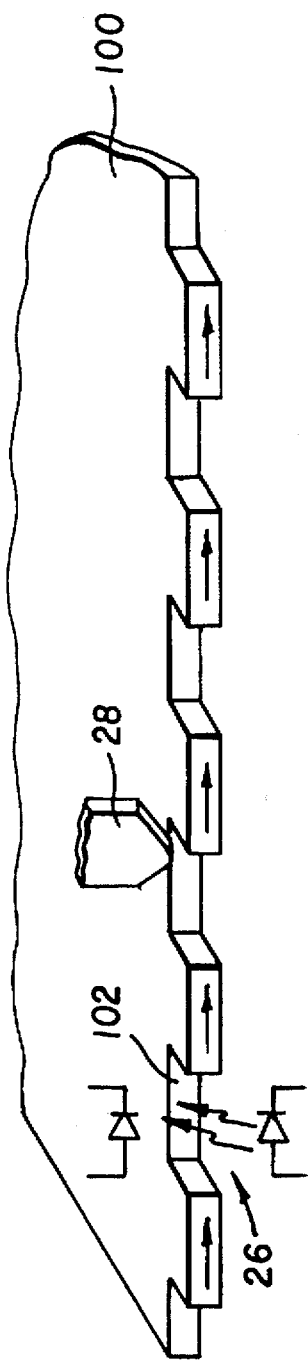
FIGS. 5 and 6 are respectively a diagrammatic view and signal diagrams useful in explaining the present invention.

The camera system operates as follows. Fresh film cartridge 14 is loaded into the camera 10 and the loading mechanism begins advancing the film 100. As the film is advanced, it is drawn past the magnetic field sensor 28 and the permanent magnet 32. Note that the sensor 28 is located before the gate 16 and the permanent magnet 32 is located after the gate 16. As the film 100 is advanced, the control electronics 24 interrogates the signal detecting electronics 30 to determine if the film 100 has been magnetized from a previous loading in a camera 10. As it is fresh film 100, no magnetization is present, so no signal is seen from the perforation 102 edges. The control electronics 24 advances the film 100 to the first frame. As each frame is exposed and advanced, the permanent magnet 32 magnetizes the perforation area 108 between perforations 102 associated with the exposed frame. If the user wishes to remove the film 100 before all frames are exposed, the film 100 is rewound into the cartridge 14 leaving a short leader protruding to allow reloading. On reloading, the camera 10 advances the film 100 while the control electronics 24 again interrogates the detection electronics 30. If the film 100 has been previously exposed, a series of pulses will be seen by the detection electronics 30 arising from the fringing fields produced at the edges of the perforations, as shown in FIG. 4. Once pulses are detected, the control electronics 30 cause the film advance mechanism to advance the film 100 until eight film perforations 102 have been detected by perforation sensor 16 with no magnetization.

Figure 6:
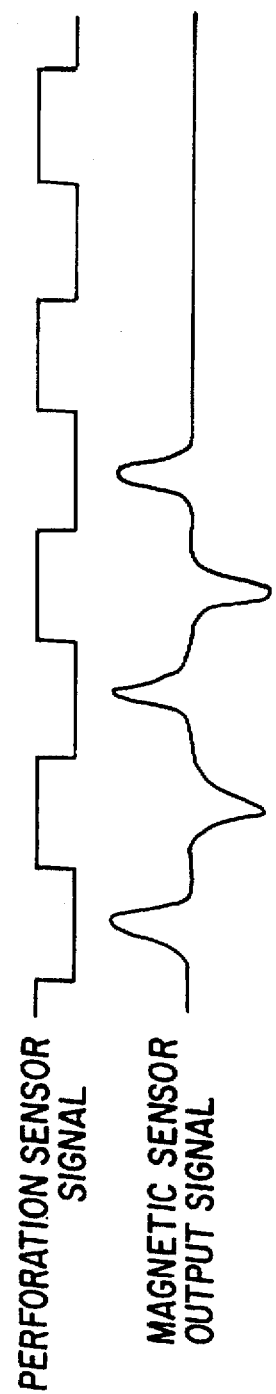

As shown in FIG. 4, perforation edge magnetization can optimally be done by positioning the perforation detector 26 and the magnetic sensor 28, such that the center of a perforation 102 is over the perforation detector 26 when the edge of a perforation 102 is under the magnetic sensor 28. In this way, the perforation detector 26 sets up a window within which a pulse from the magnetic sensor should be seen (as illustrated by the perforation sensor signal and magnetic sensor output signal of FIG. 6).

Figure 7:
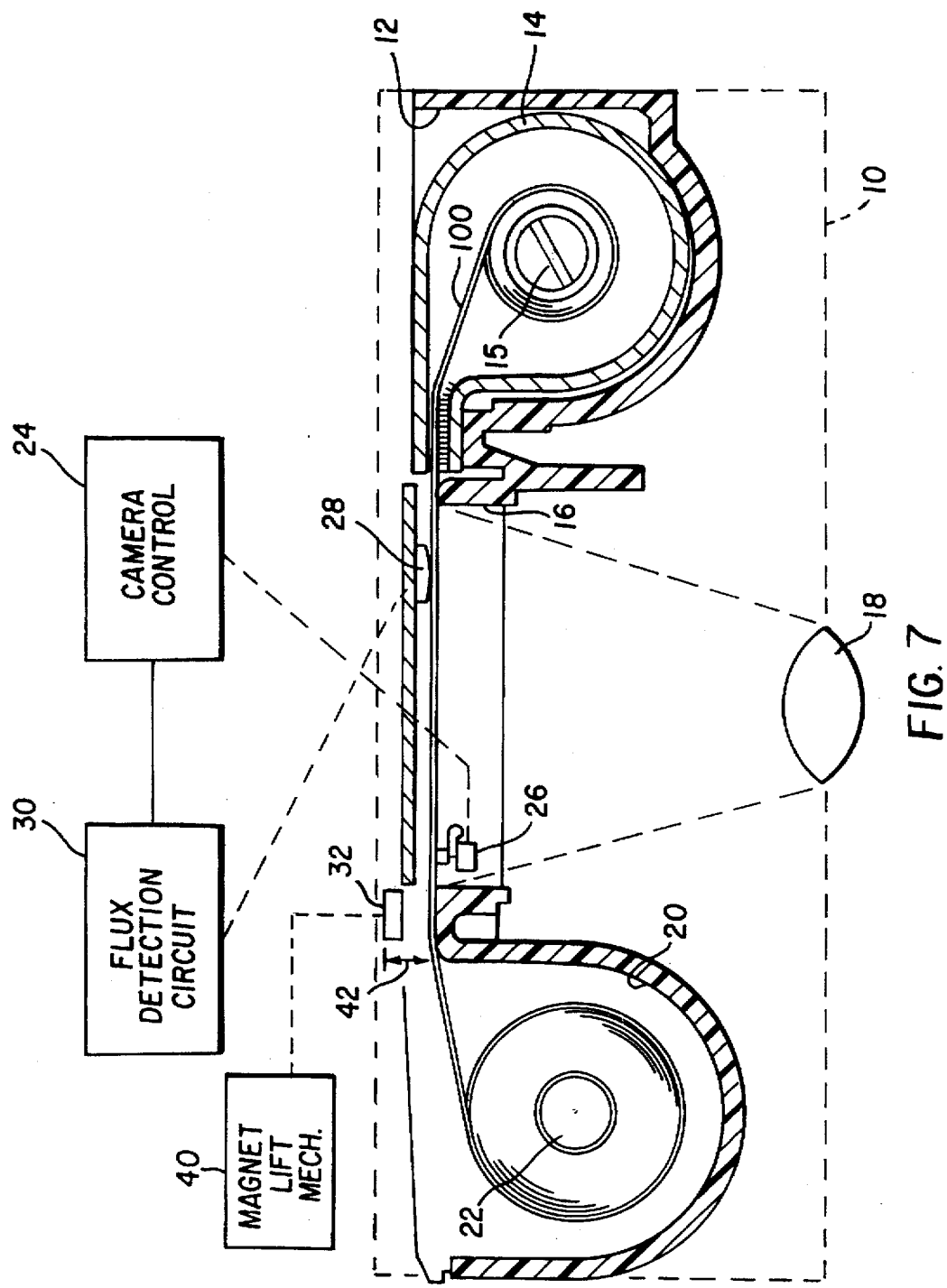
FIG. 7 is an elevational view of a camera incorporating another embodiment of the present invention.

In a second embodiment of the invention shown in FIG. 7, a mechanism 40 is added to lift the permanent magnet 32 away from the film 100 in the directions of arrow 42. This leaves a gap in the pulse train seen by the detection electronics at the beginning of each frame (see FIG. 2). This can be used by a photofinisher to determine frame boundaries without human intervention, enabling automated printing. Alternatively, the permanent magnet can be replaced with a DC inductive head and means for activating the inductive head for a predetermined period for each frame.

It will be understood that although the invention has been described in detail with specific reference to preferred embodiments thereof, that other variations and modifications may be made without departing from the spirit and scope of the invention.

Parts List 10 camera
12 film cartridge chamber
14 fresh film cartridge
15 supply spool
16 film exposing gate
18 lens
20 film take-up chamber
22 rotatable take-up spool
24 camera control
26 film perforation sensor
38 magnetic field sensor
30 magnetic flux detection circuit
32 permanent magnet
40 mechanism
42 arrow
100 a strip of film
102 perforations
104 exposed frame
106 frame boundary
108 perforation area
110 base
115 photochemical layers
120 transparent layer
122 anti-static layer and lubricating layer

What is claimed is:

1. In a camera having an exposure gate and means for transporting film past said exposure gate, said film having a series of perforations along at least one edge of said film, wherein the number of said perforations are an integer per exposure frame, said film having a substantially transparent magnetic layer at least in the region of said perforations, the improvement comprising:

a source of a steady-state magnetic field located downstream of said exposure gate and adjacent to said series of perforations for magnetizing the magnetic layer between said perforations as film is transported past said source;

a magnetic field sensor in the upstream region of said exposure gate and adjacent to said series of perforations for sensing fringing magnetic fields emanating from perforation edges, the area between which have been magnetized; and a perforation sensor located to sense said series of perforations of said film.

2. The improvement of claim 1 wherein said source of a steady state magnetic field is either a permanent magnet or a DC inductive magnetic head.

3. The improvement of claim 1 wherein said magnetic field sensor is one of a magnetoresistive sensor, a Hall effect sensor, or an inductive magnetic head.

4. The improvement of claim 1 wherein said magnetic field sensor and said perforation sensor are positioned relative to each other such that said perforation sensor is positioned over the center of a perforation when said magnetic field sensor is positioned over an edge of another perforation.

5. The improvement of claim 1 wherein said source is a permanent magnet and including a lifting mechanism coupled to said source for lifting said source away from said film for a predetermined period per film frame so that one or more areas between perforations per frame are not magnetized by said source to provide an indication of exposed film frame boundaries.

6. The improvement of claim 1 wherein said source is a DC inductive magnetic head and including means for activating said head for a predetermined period per film frame so that one or more areas between perforations per frame are not magnetized by said sensor to provide an indication of exposed film frame boundaries.

* * * * *